United States Patent
Inenaga (10) Patent No.: US 9,109,141 B2
(45) Date of Patent: Aug. 18, 2015

(54) TRANSPARENT ADHESIVE SHEET AND IMAGE DISPLAY DEVICE

(75) Inventor: Makoto Inenaga, Shiga (JP)

(73) Assignee: MITSUBISHI PLASTICS, INC., Tokyo (JP)

( * ) Notice: Subject to any disclaimer, the term of this patent is extended or adjusted under 35 U.S.C. 154(b) by 0 days.

(21) Appl. No.: 13/122,910

(22) PCT Filed: Oct. 8, 2009

(86) PCT No.: PCT/JP2009/005252
§ 371 (c)(1),
(2), (4) Date: Apr. 6, 2011

(87) PCT Pub. No.: WO2010/044229
PCT Pub. Date: Apr. 22, 2010

(65) Prior Publication Data
US 2011/0195240 A1    Aug. 11, 2011

(30) Foreign Application Priority Data
Oct. 15, 2008   (JP) .................................. 2008-265821

(51) Int. Cl.
*C09J 7/02*   (2006.01)
*B32B 7/02*   (2006.01)
(Continued)

(52) U.S. Cl.
CPC ... *C09J 7/02* (2013.01); *B32B 7/02* (2013.01); *B32B 7/06* (2013.01); *B32B 7/12* (2013.01);
(Continued)

(58) Field of Classification Search
CPC ............ B32B 7/02; B32B 7/12; B32B 27/08; B32B 27/30; B32B 27/36; B32B 7/06; B32B 2307/412; B32B 2457/20; C09J 7/00; C09J 7/02; C09J 2201/134; C09J 2201/36; C09J 2433/00; G06F 3/041; G06F 3/045; G02F 1/13338; G02F 2201/50; G02F 2202/28
USPC .................................. 428/40.1, 343, 355 AC
See application file for complete search history.

(56) References Cited

U.S. PATENT DOCUMENTS 6,074,729 A      6/2000  Watanabe et al.
6,299,975 B1 *  10/2001  Takahira et al. .............. 428/343
(Continued)

FOREIGN PATENT DOCUMENTS

EP   1 538 188    6/2005
JP   05 043 851   2/1993
(Continued)

OTHER PUBLICATIONS

International Search Report issued Dec. 15, 2009 in PCT/JP09/05252 filed Oct. 8, 2009.

(Continued)

*Primary Examiner* — Victor Chang
(74) *Attorney, Agent, or Firm* — Oblon, McClelland, Maier & Neustadt, L.L.P.

(57) ABSTRACT

Provided is a novel transparent adhesive sheet with which the cut edge is not sticky over time when a laminated body that has been bonded via the adhesive sheet is cut, which can be adhered without generating residual air bubbles, even when the surface of an adherend is uneven, and which can be adhered without foaming, even when the adherend is a material such as plastic that can generate outgas. Suggested is an adhesive sheet that has one or more layers of a first adhesive layer and one or more layer of a second adhesive layer that exhibit different viscoelastic behaviors, and has an integrated structure whereby these layers are laminated, with a dynamic shear storage modulus G' of $2\times10^4$ to $5\times10^5$ Pa for G'($20°$ C.) and $1\times10^4$ to $1\times10^5$ Pa for G'($150°$ C.) when measured with a 1 Hz frequency temperature dispersion.

7 Claims, 1 Drawing Sheet

(51) Int. Cl.
- *B32B 7/06* (2006.01)
- *B32B 7/12* (2006.01)
- *B32B 27/08* (2006.01)
- *B32B 27/30* (2006.01)
- *B32B 27/36* (2006.01)
- *C09J 7/00* (2006.01)
- *G06F 3/041* (2006.01)
- *G06F 3/045* (2006.01)
- *G02F 1/1333* (2006.01)

(52) U.S. Cl.
CPC ............... *B32B 27/08* (2013.01); *B32B 27/30* (2013.01); *B32B 27/36* (2013.01); *C09J 7/00* (2013.01); *G06F 3/041* (2013.01); *G06F 3/045* (2013.01); *B32B 2307/412* (2013.01); *B32B 2457/20* (2013.01); *C09J 2201/134* (2013.01); *C09J 2201/36* (2013.01); *C09J 2203/318* (2013.01); *C09J 2433/00* (2013.01); *G02F 1/13338* (2013.01); *G02F 2201/50* (2013.01); *G02F 2202/28* (2013.01); *Y10T 428/1462* (2015.01); *Y10T 428/24942* (2015.01); *Y10T 428/24967* (2015.01); *Y10T 428/28* (2015.01); *Y10T 428/2839* (2015.01)

(56) References Cited

U.S. PATENT DOCUMENTS

| | | | |
|---|---|---|---|
| 2002/0025441 A1* | 2/2002 | Hieda et al. | 428/440 |
| 2005/0154166 A1 | 7/2005 | Husemann et al. | |
| 2006/0024521 A1 | 2/2006 | Everaerts et al. | |
| 2007/0218957 A1* | 9/2007 | Nishikawa et al. | 455/566 |
| 2009/0022967 A1* | 1/2009 | Inenaga | 428/214 |

FOREIGN PATENT DOCUMENTS

| | | |
|---|---|---|
| JP | 06 139 962 | 5/1994 |
| JP | 08 336 925 | 12/1996 |
| JP | 09 033 723 | 2/1997 |
| JP | 9-263742 | 10/1997 |
| JP | 2001 234 129 | 8/2001 |
| JP | 2002-249752 | 9/2002 |
| JP | 2002 348 150 | 12/2002 |
| JP | 2003 029 645 | 1/2003 |
| JP | 2003-27017 | 1/2003 |
| JP | 2003 213 228 | 7/2003 |
| JP | 2004-54492 | 2/2004 |
| JP | 2006 265 461 | 10/2006 |
| JP | 2008-32852 | 2/2008 |
| JP | 2008 508 394 | 3/2008 |
| JP | 2009-507255 | 2/2009 |
| WO | 2006 112 311 | 10/2006 |
| WO | WO 2007/029936 A1 | 3/2007 |
| WO | WO 2008120834 A1 * | 10/2008 |

OTHER PUBLICATIONS

Notice of Allowance issued Jul. 20, 2011, in Japanese Patent Application No. 2010-533812.

U.S. Appl. No. 13/505,972, filed Jun. 8, 2012, Niimi, et al.

* cited by examiner

TRANSPARENT ADHESIVE SHEET AND IMAGE DISPLAY DEVICE

The present invention relates to a transparent adhesive sheet. Specifically, the present invention relates to a transparent adhesive sheet that can be suitably used in bonding transparent panels such as a protective panel and a touch panel to an image display panel in a plane type image display device such as a mobile terminal, PDA, a game machine, TV, a touch panel, a pen tablet and the like using an image display panel such as LCD, PDP or EL.

BACKGROUND OF THE INVENTION

A plane type image display device is applied to various fields such as a TV, a personal computer, a cellular phone (mobile) and the like, and is rapidly expanding in the market. In such plane type image display devices, a protective panel may be disposed on a display panel or a touch panel to prevent the display panel or the touch panel from being damaged. Conventionally, an image display panel and a protective panel were laminated with a space disposed between them, whereby to enhance shock-absorbing characteristics, and thus to prevent scratch or crack of the image display panel. However, it has a problem in that reflection occurs in the interface of the protective panel and the space, leading to a decrease in image visibility, particularly in outdoor image visibility. Furthermore, it also has a problem in that it is difficult to realize a thin body due to disposition of the space.

As a method of improving both thinning and visibility, a method has been suggested, in which an image display panel and a protective panel are directly laminated via a transparent adhesive agent or adhesive sheet (see those described below).

For example, Patent Reference 1 discloses an adhesive sheet that has a first pressure-sensitive adhesive layer, second pressure-sensitive adhesive layers formed on the two surfaces of the first pressure-sensitive adhesive layer, and release films adhering to adhesive surfaces of the two pressure-sensitive adhesive layers, in which the first pressure-sensitive adhesive layer is formed with use of a pressure-sensitive adhesive agent having viscoelastic characteristics such as of $5 \times 10^3$ to $5 \times 10^5$ Pa of a storage modulus G'(1 Hz) at 20° C. measurement temperature and 1 Hz frequency, and $5 \times 10^1$ to $5 \times 10^3$ Pa of a storage modulus G'($10^{-7}$ Hz) at 20° C. standard temperature and $10^{-7}$ Hz frequency, and the second pressure-sensitive adhesive layer is formed with use of a pressure-sensitive adhesive agent having viscoelastic characteristics such as $1 \times 10^4$ to $5 \times 10^6$ Pa of a storage modulus G'(1 Hz) at 20° C. measurement temperature, and $1 \times 10^4$ to $1 \times 10^6$ Pa of a storage modulus G'($10^7$ Hz) at 20° C. standard temperature, which is an adhesive sheet that does not require temporary bond by heating or high temperature and high pressure treatment with an autoclave, and can bond glass plates at room temperature.

Furthermore, Patent Reference 2 discloses a method of forming, before ultraviolet cross-linking, an adhesive layer having a low cohesion force ($5 \times 10^3$ to $5 \times 10^5$ Pa of a storage modulus G' at 20° C. measurement temperature and 1 Hz frequency, and $5 \times 10^1$ to $5 \times 10^3$ Pa of a storage modulus G' at 20° C. standard temperature and $10^{-7}$ Hz frequency), which includes bringing panels into intimate contact with each other via the adhesive layer without generating residual air bubbles therebetween; and irradiating ultraviolet rays (UV) after the intimate contact onto the surface of the protective panel to cure the protective panel so that the protective panel has viscoelastic characteristics of $1 \times 10^4$ to $1 \times 10^6$ Pa of a storage modulus G' at 20° C. measurement temperature and 1 Hz frequency, and $1 \times 10^4$ Pa or more of a storage modulus G' at 20° C. standard temperature and $10^{-7}$ Hz frequency.

Furthermore, Patent Reference 3 discloses a constitution in which two kinds of adhesive layers having different cohesion forces are disposed on both sides of a gas barrier base material, in which panels are brought into intimate contact with each other without generating residual air bubbles by making use of a first adhesive layer having a low cohesion force, and attack of volatile components from a protective panel is blocked by the gas barrier base material and a second adhesive layer having high cohesion force.

Patent Reference 1: Japanese Patent Application Laid-Open (JP-A) No. 2001-234129
Patent Reference 2: JP-A No. 2002-348150
Patent Reference 3: International Publication No. WO2006-112311

Such conventionally disclosed adhesive agent or adhesive sheet has such a problem that when a laminated body obtained by laminationing via the adhesive agent or adhesive sheet is cut, cut edges become sticky after a period of time and thus adheres to a production facility, which becomes a trouble in the production process, and invite foreign substances, dust and the like to adhere thereto, which becomes a cause of contamination.

Figure 1:
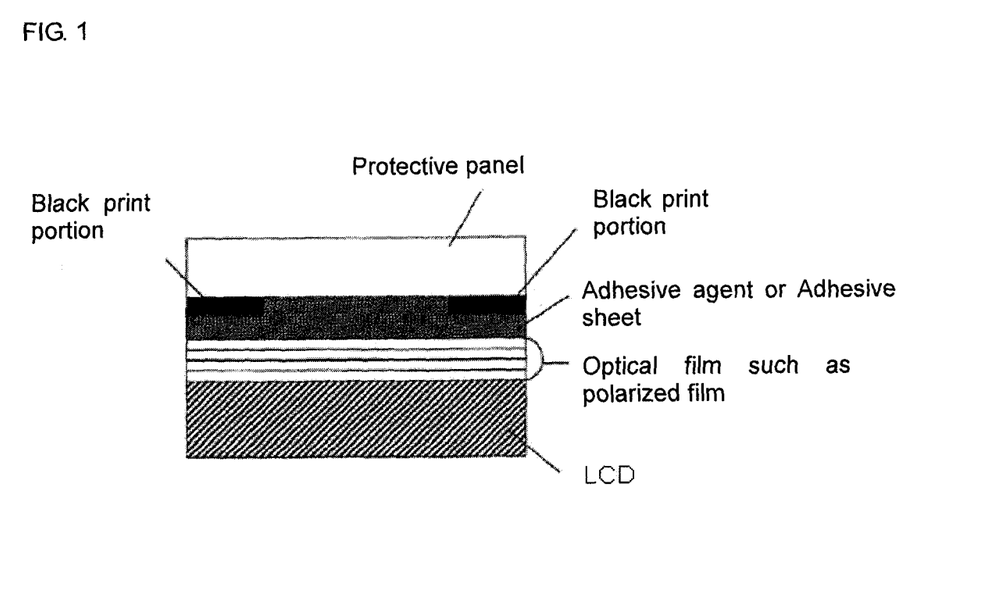

Furthermore, for example, in a display screen of a mobile phone and the like, a constitution was sometimes adopted in which a polarized film and the like were laminated on a liquid crystal panel display (LCD), and on top of that, a protective panel made of plastic was laminated via an adhesive agent or adhesive sheet as shown in FIG. 1. At this time, a black print portion (5 μm to 20 μm or so in thickness) was normally provided in the margins on the back side of the protective panel. In such a case, if the adhesive agent does not sufficiently have ability of encapsulate features of an uneven portion of a stepped portion that is formed in the margin of the black print portion, air bubbles remain leading to a decrease in screen visibility. Furthermore, if the protective panel is made of plastic, gas (referred to as outgas) is generated from the protective panel. Therefore, if the adhesive agent or adhesive sheet does not have enough adhesive force and cohesion force to oppose the pressure of this gas, the gas remains in the adhesive agent or adhesive sheet, and thus if the temperature becomes high, the residual gas foams leading to a decrease in screen visibility.

As a countermeasure to such outgas, for example, as described in Patent Reference 2 above, suggested is a method of forming an adhesive agent having a low cohesion force, which includes bringing panels into intimate contact with each other without generating residual air bubbles, and irradiating ultraviolet onto the protective panel to cause cross-linking. However, in this method, the cross-linking needs to be performed after bonding of the protective panels, and thus the method has a problem from the point of view of the productivity. Furthermore, for example, as described in Patent Reference 3 above, suggested is a method which includes disposing an outgas barrier layer. However, this method has problems such as an increase in thickness or weight, and a decrease in transparency.

Therefore, an object of the present invention is to provide a novel transparent adhesive sheet, with which the cut edge is not sticky over time when a laminated body that has been bonded via the adhesive sheet is cut, which can adhere no residual air bubbles, even when the surface of an adherend has unevenness of 5 μm to 20 μm or so, and further which can adhere without foaming under high temperature environment, for example, 80° C. or so, even when the adherend is a material such as plastic that generates outgas.

The present invention suggests a transparent adhesive sheet that is constituted to have one or more layers respectively of a first adhesive layer and a second adhesive layer that exhibit different viscoelastic behaviors from each other, and has an integrated structure whereby these layers are laminated and has value of dynamic shear storage modulus G' when measured with a 1 Hz frequency temperature dispersion which is within ranges described below:

$2 \times 10^4$ to $5 \times 10^5$ Pa for G'(20° C.)
$1 \times 10^4$ to $1 \times 10^5$ Pa for G'(150° C.)

With an adhesive sheet imparted with the viscoelastic behaviors as described above, when a laminated body that has been bonded via the adhesive sheet is cut, the cut edge is not sticky over time, and the adhesive sheet can adhere with no residual air bubbles, even when the surface of an adherend has unevenness of 5 μm to 20 μm or so, and further can adhere without foaming under high temperature environment, for example, 80° C. or so, even when the adherend is a material such as plastic that generates outgas.

In order to adhere without generating residual air bubbles when the surface of an adherend is uneven, generally a soft and easily wettable adhesive agent or adhesive sheet is used. However, simply only with softness of the adhesive agent or adhesive sheet, the cut edge becomes sticky, or the adhesive agent or adhesive sheet does not have a cohesion force to oppose the gas pressure of the outgas, and thus the gas remains inside, and the residual gas foams when the temperature becomes high, leading to a decrease in screen visibility. On the other hand, with a hard adhesive agent or adhesive sheet, when the surface of an adherend is uneven, air bubbles remain, leading to a decrease in visibility.

Therefore, the present invention allows an adhesive sheet to have a combination of incompatible properties, that is to say, a property of the cut edge not being sticky over time after the cutting, a property of adhering without generating residual air bubbles even when the surface of an adherend is uneven, and further a property of sufficiently withstanding outgas and thus adhering without foaming under high temperature, not by means of simply manufacture of a soft or hard adhesive sheet, but by means of manufacture of an adhesive sheet that has a lamination of a first adhesive layer and a second adhesive layer having different viscoelastic behaviors, and that has prescribed values of the dynamic shear storage modulus G' in totally different temperature regions of 20° C. and 150° C.

As a means of forming such transparent adhesive sheet of the present invention, each of the first adhesive layer and the second adhesive layer is preferably formed to have a value of the dynamic shear storage modulus G', which is measured in a 1 Hz frequency temperature dispersion, within ranges of (a) and (b) described below:

(a) G'(20° C.) of the first adhesive layer is $2 \times 10^4$ to $5 \times 10^5$ Pa, and G'(150° C.) of the first adhesive layer is $1 \times 10^4$ to $1 \times 10^5$ Pa.

(b) G'(20° C.) of the second adhesive layer is $2 \times 10^5$ to $5 \times 10^6$ Pa, and G'(150° C.) of the second adhesive layer is $5 \times 10^4$ to $5 \times 10^5$ Pa.

A transparent adhesive sheet, which has a first adhesive layer and a second adhesive layer having different viscoelastic behaviors, dominantly exhibits a viscoelastic behavior of a soft adhesive layer as a whole of the transparent adhesive sheet. That is to say, when the transparent adhesive sheet described above is measured for the dynamic viscoelasticity from the low temperature side in a shear method, the first adhesive layer having small modulus is deformed (misaligned) first, and the second adhesive layer, which is relatively hard, is hardly deformed, whereby the transparent adhesive sheet is soft overall, and the viscoelastic behavior of the first adhesive layer is exhibited dominantly. Therefore, the transparent adhesive sheet of the present invention is formed such that the first adhesive layer is softer than the second adhesive layer, and the dynamic shear storage modulus G' of the first adhesive layer in totally different temperature regions of 20° C. and 150° C. is respectively prescribed.

BRIEF DESCRIPTION OF THE DRAWINGS

FIG. 1 is a sectional view that shows one exemplary constitution of a lamination that is adopted in a display screen of a mobile phone and the like.

DETAILED DESCRIPTION OF THE INVENTION

Hereinafter, one exemplary embodiment of the present invention will be explained, but the present invention is not limited to the embodiment described below.

The transparent adhesive sheet of the present embodiment (hereinafter, referred to as "the present adhesive sheet".) is an adhesive sheet that is constituted to have one or more layers respectively of a first adhesive layer and a second adhesive layer that exhibit different viscoelastic behaviors, and has an integrated structure whereby these layers are laminated.

The present adhesive sheet may be formed with one or more layers respectively of a first adhesive layer and a second adhesive layer that exhibit different viscoelastic behaviors, and has an integrated structure whereby these layers are laminated as described above, wherein the first adhesive layer and the second adhesive layer have, for example, viscoelastic characteristics (a) and (b) described below:

(a) the first adhesive layer: the dynamic shear storage modulus G'(20° C.) measured in a 1 Hz frequency temperature dispersion at 20° C. is $2 \times 10^4$ to $5 \times 10^5$ Pa, and the dynamic shear storage modulus G' at 150° C. (150° C.) is $1 \times 10^4$ to $1 \times 10^5$ Pa.

(b) the second adhesive layer: the dynamic shear storage modulus G'(20° C.) measured in a 1 Hz frequency temperature dispersion at 20° C. is $2 \times 10^5$ to $5 \times 10^6$ Pa, and the dynamic shear storage modulus G' at 150° C. (150° C.) is $5 \times 10^4$ to $5 \times 10^5$ Pa.

G'(20° C.) of the first adhesive layer may be $2 \times 10^4$ to $5 \times 10^5$ Pa, preferably $2 \times 10^4$ to $8 \times 10^4$ Pa.

When G'(20° C.) of the first adhesive layer is $2.0 \times 10^4$ Pa or more, sticking of a cut edge does not occur at room temperature when the laminated body that has been bonded via this adhesive sheet is cut. For example, when the laminated body is cut with a Thomson's knife, deterioration of cutting properties such as sticking to the knife or the like does not happen, and deterioration of handling property such as sticking to a production machine or the like after the cutting also does not happen. On the other hand, when G'(20° C.) of the first adhesive layer is $5 \times 10^5$ Pa or less, for example, in a case where a protective panel that has print unevenness on the back side is bonded, or the like, it is possible to eliminate residual air bubbles due to the adhesive agent unevenly squeezed within an uneven portion, without a remarkable decrease in flexibility.

It is important that G'(150° C.) of the first adhesive layer is $1 \times 10^4$ to $1 \times 10^5$ Pa, and is preferably $2 \times 10^4$ to $5 \times 10^4$ Pa.

If G'(150° C.) of the first adhesive layer is $1 \times 10^4$ Pa or more, it is possible to prevent occurrence of misalignment of adhesive layers or overflow of an adhesive material under high temperature environment.

On the other hand, if G'(150° C.) of the first adhesive layer is $1×10^5$ Pa or less, it is possible to prevent recovery of elasticity due to viscosity decrease. Accordingly, for example, it is possible to prevent generation of voids in a recessed corner portion of a print uneven portion on the back side of the protective panel.

G'(20° C.) of the second adhesive layer may be $2×10^5$ to $5×10^6$ Pa, and is preferably $5×10^5$ to $2×10^6$ Pa.

When G'(20° C.) of the second adhesive layer is $2×10^5$ Pa or more, the adhesive sheet can sufficiently withstand outgas and can suppress foaming. On the other hand, when G'(20° C.) of the second adhesive layer is $5×10^6$ Pa or less, it is possible to resolve problems such as insufficient wetting that proceeds on the surface of the adherend due to the adhesive sheet being hard.

G'(150° C.) of the second adhesive layer may be $5×10^4$ to $5×10^5$ Pa, and is preferably $1×10^5$ to $3×10^5$ Pa.

When G'(150° C.) of the second adhesive layer is $5×10^4$ Pa or more, the adhesive sheet can sufficiently withstand outgas and can suppress foaming. On the other hand, when G'(150° C.) of the second adhesive layer is $5×10^5$ Pa or less, it is possible to obtain sufficient adhesion force.

Furthermore, the temperature where the first adhesive layer and the second adhesive layer exhibits the maximum value of dynamic Tan δ (; Tg), which is measured in a 1 Hz frequency temperature dispersion, is preferably within the range described below, respectively.

Tg (1) of the first adhesive layer is less than −10° C.

Tg (2) of the second adhesive layer is −10° C. or more.

Tg (1) of the first adhesive layer is preferably less than −10° C., and further preferably −20° C. or less in view of improvement in flexibility. When Tg (1) of the first adhesive layer is less than −10° C., the adhesive sheet can maintain flexibility, and thus, for example, can eliminate visibility decrease due to residual air bubbles when the surface of an adherend is uneven or has print unevenness or the like.

On the other hand, Tg (2) of the second adhesive layer is preferably −10° C. or more, and Tg (2) is more preferably −10° C. or more and less than 10° C. in view of high adherence being obtained. When Tg (2) of the second adhesive layer is −10° C. or more, it is possible to secure sufficient adhesive force, and prevent foaming of residual gas even under high temperature without residual gas within the adhesive agent due to the gas pressure of the outgas even when the adherend is a material such as plastic that generates outgas. Conversely, when Tg (2) is less than 10° C., the adhesive sheet is not too hard, and thus has no such problems as difficult wetting and insufficient adhesion on the surface of the adherend. In this case, such problems may be also resolved by adhesion with warming, which is a factor for cost increase and thus is not preferable.

As described above, Tg of the first adhesive layer is different from that of the second adhesive layer, and it is preferable that Tg (1) of the first adhesive layer is lower than Tg (2) of the second adhesive layer. Particularly, the difference between Tg (1) and Tg (2) is preferably 10° C. or more, more preferably 20° C. or more, and further more preferably 40° C. or more.

Furthermore, each thickness of the first adhesive layer and the second adhesive layer is preferably within the range described below. That is to say, the thickness of the first adhesive layer is preferably greater than the thickness of the second adhesive layer.

The thickness of the first adhesive layer is 50 µm to 2000 µm.

The thickness of the second adhesive layer is 5 µm to 50 µm.

It is preferable that the first adhesive layer has necessary thickness to fill the surface unevenness. Therefore, it is preferable that the thickness of the first adhesive layer is suitably selected in accordance with the thickness of the adherend material and the surface unevenness.

For example, when the adherend is a film or sheet that has small surface unevenness on the surface, the thickness of the first adhesive layer is preferably 50 µm to 500 µm, and further preferably 100 µm to 500 µm.

On the other hand, for example, when the adherend is a rigid plate material such as a glass, or an adherend that has relatively big print unevenness, the thickness of the first adhesive layer is more preferably 500 µm to 2000 µm.

The thickness of the second adhesive layer is preferably 5 µm to 50 µm, and more preferably 15 µm to 30 µm in view of securing adherence. At this time, when the thickness of the second adhesive layer is 5 µm or more, it is possible to obtain sufficient adhesive force, and prevent cost increase when the thickness of the second adhesive layer is 50 µm or less.

(Materials for First Adhesive Layer and Second Adhesive Layer)

Examples of a base compound (a material to be a major component, also referred to as a base polymer) of the first adhesive layer and the second adhesive layer include, for example, polymers of acryls, silicones, polyurethanes, styrenes, polyesters, polyethers, epoxys or the like. The nature (form) of the base compound may be various, such as a liquid, a high viscosity body and an elastomer body. Such base polymer (base compound) may be suitably selected, and, each of the adhesive layer having desired viscoelastic characteristics can be formed with use of a cross-linking method suitable for each of the selected base polymer.

However, in consideration of the functions required for the first adhesive layer and the second adhesive layer, the thickness of the first adhesive layer is preferably greater as described above, and thus at least the first adhesive layer is preferably formed with a solventless material that has no solvent. The limit for the thickness of a solvent-based material is 100 µm.

On the other hand, the thickness of the second adhesive layer is not necessarily great, and thus may be formed with any one of a solvent-based material and a solventless material. However, in consideration of production efficiency and the like, the second adhesive layer is formed preferably with use of a solvent-based material.

Examples of a preferable solventless material in formation of the first adhesive layer include, for example, acrylic polymers, particularly acrylic acid ester polymers (including copolymers). They are preferably used as a base polymer (base compound), and subjected to cross-linking to form the first adhesive layer.

The acrylic acid ester polymer (including copolymers) may be prepared with suitable adjustment of properties such as glass transition temperature (Tg) by suitably selecting the kind or composition ratio of acrylic monomers or methacrylic monomers that are used in polymerization of the acrylic acid ester polymer, and further polymerization conditions and the like.

Examples of the acrylic monomers or methacrylic monomers used in polymerization of the acrylic acid ester polymers include, for example, 2-ethylhexyl acrylate, n-octyl acrylate, n-butyl acrylate, ethyl acrylate, methyl methacrylate and the like. Examples of the acrylic monomers or methacrylic monomers also include vinyl acetate, hydroxyethyl acrylate, acrylic acid, glycidyl acrylate, acrylic amide, acrylic nitrile, methacrylic nitrile, fluoro acrylate, silicone acrylate and the like, which are obtained by copolymerization of those mentioned above with hydrophilic groups or organic functional groups or the like. As the polymerization treatment using these monomers, known polymerization methods such as solution polymerization, emulsion polymerization, massive polymerization or suspension polymerization may be adopted. At this time, a polymerization initiator such as a thermal polymerization initiator and a photo polymerization initiator may be used depending on the polymerization method to obtain an acrylic acid ester copolymer.

When a solvent is not used in polymerization, it is difficult to use a base polymer having high molar weight. Therefore, the weight average molar weight of the acrylic acid ester polymer is preferably 100,000 to 700,000, particularly preferably 200,000 to 500,000, further particularly preferably 250,000 to 500,000.

Furthermore, in the present application, the weight average molar weight (MW)/number average molar weight (MN) of the acrylic acid ester polymer is preferably relatively great, and preferably 5 to 10, particularly preferably 6 to 9.

Examples of the cross-linking monomer (cross-linking agent) that is used in cross-linking the acrylic acid ester polymer include multifunctional (meth)acrylate having two or more (meth) acryloyl groups, or multifunctional organic functional group resins having two or more organic functional groups such as an isocyanate group, an epoxy group, a melamine group, a glycol group, a siloxane group and an amino group, or organic metal compounds having a complex of a metal such as zinc, aluminum, sodium, zirconium and calcium.

Furthermore, in cross-linking the acrylic acid ester polymer, it is effective to suitably add a cross-linking initiator (peroxidation initiator or photo initiator) or a reaction catalyst (tertiary amine compounds, quaternary ammonium compounds, tin laurylate compounds and the like).

(Other Additive)

In addition to the components described above, if necessary, various additives may be suitably blended such as a colorant, e.g., a pigment and a dye having near-infrared absorption property, a tackifier, an antioxidant, an anti-aging agent, a hygroscopic agent, an ultraviolet absorption agent, a silane coupling agent, resins of a natural product or a synthetic product, a glass fiber and glass beads.

(Constitution of Lamination)

The present adhesive sheet is an adhesive sheet that is constituted to have one or more layers respectively of a first adhesive layer and a second adhesive layer, and has an integrated structure whereby these layers are laminated as described above. Accordingly, as a constitution of the lamination that may be adopted in the present adhesive sheet, for example, lamination constitution such as the first adhesive layer (hereinafter, referred to as "the first")/the second adhesive layer (hereinafter, referred to as "the second"), the first/the second/the first, the second/the first/the second, and the first/the second/the first/the second may be adopted. The constitution of the lamination is particularly preferably two layer constitution composed of the first/the second or three layer constitution composed of the second/the first/the second, and further particularly preferably three layer constitution composed of the second/the first/the second.

When the constitution of the lamination is the two layer constitution composed of the first/the second, the second adhesive layer side may be used as an adhesive surface having greater adhesive force, and the first adhesive layer side may be used as a release surface having relatively low adhesive force.

Another layer may be interposed between the first adhesive layer and the second adhesive layer. However, lamination constitution, in which at least outgas barrier layer is not interposed, is preferable from a point that the present adhesive sheet is characterized by prevention of foaming under high temperature environment without disposition of an outgas-barrier layer.

(Viscoelasticity of the Present Adhesive Sheet)

In a manner as described above, it is possible to form a transparent adhesive sheet that is constituted to have one or more layers respectively of a first adhesive layer and a second adhesive layer that exhibit different viscoelastic behaviors from each other, and has an integrated structure whereby these layers are laminated and has value of dynamic shear storage modulus G' when measured with a 1 Hz frequency temperature dispersion which is within ranges described below:

$2\times10^4$ to $5\times10^5$ Pa for G'(20° C.)
$1\times10^4$ to $1\times10^5$ Pa for G'(150° C.)

The dynamic shear storage modulus G'(20° C.) of the present adhesive sheet is importantly $2\times10^4$ to $5\times10^5$ Pa, preferably $5\times10^4$ to $5\times10^5$, and particularly preferably $1\times10^5$ to $3\times10^5$.

Herein, when the dynamic shear storage modulus G'(20° C.) of the present adhesive sheet is $2.0\times10^4$ or more, it is possible to suppress sticking at the cut edge at least under room temperature. For example, when the laminated body is cut with a Thomson's knife, it is possible to suppress sticking to the knife, and also suppress deterioration of handling property after the cutting such as sticking to a production machine or the like. When the dynamic shear storage modulus G'(20° C.) is $5\times10^5$ Pa or less, it is possible to suppress decrease of flexibility or adherence. For example, when a protective panel that has print unevenness on the back side, is bonded, it is possible to prevent residual air bubbles due to the adhesive agent unevenly squeezed within an uneven portion.

Furthermore, the dynamic shear storage modulus G'(150° C.) of the present adhesive sheet is importantly $1\times10^4$ to $1\times10^5$ Pa, preferably $2\times10^4$ to $6\times10^4$, and particularly preferably $2\times10^4$ to $5\times10^4$.

Herein, when the dynamic shear storage modulus G'(150° C.) of the present adhesive sheet is $1\times10^4$ or more, it is possible to prevent occurrence of misalignment of adhesive layers or defect in adhesive material under high temperature environment. When the dynamic shear storage modulus G'(150° C.) of the present adhesive sheet is $1\times10^5$ Pa or less, it is possible to prevent recovery of elasticity due to viscosity decrease. Accordingly, for example, it is possible to prevent generation of voids in a recessed corner portion of a print uneven portion on the back side of the protective panel.

(Manufacturing Method)

Any one of the first adhesive layer and the second adhesive layer of the present adhesive sheet can be formed as an adhesive layer having desired viscoelastic characteristics by suitably selecting a base polymer using a cross-linking method suitable for each of the selected base polymer.

For example, when an acrylic acid ester polymer is selected as the base polymer, the first adhesive layer-attached sheet or the second adhesive layer-attached sheet can be obtained by adding a cross-linking agent and a reaction initiator or a reaction catalyst or the like, mixing them with stirring, defoaming the mixture sufficiently, and then forming a film to an intended thickness on a release film and heat-drying or cross-linking the film by ultraviolet irradiation.

On the other hand, when a solvent type-acrylic adhesive agent is selected as the base polymer, the first adhesive layer-attached sheet or the second adhesive layer-attached sheet can be obtained by adding various curing agents or the like, mixing them with stirring, forming a film to an intended thickness on a release film, and drying the solvent.

The first adhesive layer-attached sheet and the second adhesive layer-attached sheet may be first prepared, respectively in a manner as described above, and then they are combined in a post process to form a laminated sheet. Furthermore, a sheet attached with one of the adhesive layers may be first prepared, and a composition of the other adhesive layer may be coated on this adhesive layer-attached sheet to form a laminated sheet. Furthermore, a composition for forming the first adhesive layer and a composition for forming the second adhesive layer may be multi-step coated in order on a release film to form a laminated sheet. Furthermore, a composition for forming the first adhesive layer and a composition for forming the second adhesive layer may be coextruded to form a laminated sheet.

The manufacturing method may be suitably selected to manufacture the laminated sheet depending on the nature of the adhesive agent or the cross-linking method.

The storage modulus of the adhesive sheet at specific temperature may be adjusted not only depending on the kind and composition ratio of polymerization monomers, which are components of the acrylic acid ester copolymer as the base polymer, and polymerization conditions, but also depending on the kind and the amount of a cross-linking agent and a cross-linking initiator, cross-linking conditions and the like.

Since $G'(20°\ C.)$ value of the adhesive layer is particularly affected by Tg value of the base polymer, $G'(20°\ C.)$ value tends to decrease as much as Tg of the base polymer decreases, and $G'(20°\ C.)$ value tends to increase as much as Tg increases.

For example, for the first adhesive layer, $G'(20°\ C.)$ of the first adhesive layer may be adjusted to the range of the present invention by adjusting the kind and the composition ratio of copolymerization monomers so that Tg of the base polymer is less than $-10°\ C.$ Specifically, a desired base polymer of the first adhesive layer may be adjusted, for example, by random-copolymerizing a greater portion of monomers having relatively low Tg such as n-butyl acrylate monomer and 2-ethylhexyl acrylate monomer, and a less portion of monomers having relatively high Tg such as methyl methacrylate, acrylic acid and vinyl acetate, as the copolymerization monomer components forming the acrylic acid copolymer of the base polymer, and as results, the first adhesive layer having the storage modulus in the specific range at specific temperature of $-10°\ C.$ or less Tg may be prepared.

For the second adhesive layer, $G'(20°\ C.)$ of the second adhesive layer may be adjusted to the range of the present invention by adjusting the kind and the composition ratio of copolymerization monomers so that Tg of the base polymer is $-10°\ C.$ or more.

Specifically, a desired base polymer of the second adhesive layer may be adjusted, for example, by random-copolymerizing a less portion of monomers having relatively low Tg such as n-butyl acrylate monomer and 2-ethylhexyl acrylate monomer, and a greater portion of monomers having relatively high Tg such as methyl methacrylate, acrylic acid and vinyl acetate, as the copolymerization monomer components forming the acrylic acid copolymer of the base polymer, and as results, the second adhesive layer having the storage modulus in the specific range at specific temperature of $-10°\ C.$ or more of Tg may be prepared.

$G'(150°\ C.)$ value of the adhesive layer is affected by the molar weight of the base polymer, the molar weight between cross-linking points and the molar weight between entanglement points after the cross-linking. $G'(150°\ C.)$ value tends to increase as much as the molar weight of the base polymer, the molar weight between cross-linking points or the molar weight between entanglement points increase.

Accordingly, from the range of $G'(150°\ C.)$, the first adhesive layer is preferably prepared by using a base polymer having a molar weight that is required in melt-molding without a solvent (Mw: 2 to $6 \times 10^5$) for the required thickness, and large amounts of a cross-linking agent and a photo initiator in order to suppress sticking.

Furthermore, for the second adhesive layer, it is preferable that the amount of a cross-linking agent is small and the molar weight between cross-linking points is great in order to grant strong adherence to the second adhesive layer, whereby to obtain the second adhesive layer that is flexible and has the viscoelastic behavior of high cohesion force.

(Application)

A conventional adhesive sheet has such problems that the conventional adhesive sheet is sticky and adhered to a cutting knife in the cutting process, that the cut surface is deformed with the friction force in the cutting process, that an unwanted part of a cut piece is not peeled well in crud removing process, and that a cut piece is dented or recessed by pressure and the like after a second process or adhered with a foreign substance in a cut section. However, the present adhesive sheet has an advantage of not having such problems.

Accordingly, the present adhesive sheet may be suitably used in bonding a transparent panel such as a protective panel to an image display panel in a plane type image display device such as a mobile terminal, PDA, a game machine, TV, a touch panel, a pen tablet and the like using, for example, LCD, PDP, EL or the like.

The present adhesive sheet may be cut into a desired shape by a cutting device using, for example, Thomson's knife, a super cutter, a laser and the like, and may be processed to a piece of a transparent adhesive sheet (referred to as "the piece of the present adhesive sheet") and used.

The piece of the present adhesive sheet has only small generation of air bubbles after it has been bonded to an adherend, and has very small sticking to the edge after the cutting, and can be used as a second processed product that is excellent in handling property. Accordingly, the piece of the present adhesive sheet can be suitably used in constitution of an image display device, for example, a mobile phone, a portable game machine, or a mobile terminal, and further a fish finder and the like.

Herein, the piece of the transparent adhesive sheet means a transparent adhesive sheet that is cut into a desired size and shape. When the transparent adhesive sheet is referred to as the adhesive sheet, it also encompasses the concept a piece of the adhesive sheet. Accordingly, the present adhesive sheet also encompasses the piece of the present adhesive sheet.

Examples of the shape of the piece of the present adhesive sheet include, for example, a square shape, which is formed by cutting the present adhesive sheet into grid in planar view, and in addition, triangle and hexagonal shapes. In addition, the piece of the present adhesive sheet may be processed to any shape such as a notched shape and a punched shape in accordance with the adherend.

The present adhesive sheet and a piece thereof may be provided, for example, as a transparent adhesive sheet that has a release film disposed on both sides thereof.

At this time, the release film to be used may be suitably selected from those obtained by applying a silicone resin to a cast film or a stretched film of polyesters, polypropylenes or polyethylenes and subjecting the film to a release treatment, or release papers and the like. Particularly, release films having different release forces or different thicknesses are preferably used in both sides of the adhesive sheet.

When the present adhesive sheet and a piece thereof are constituted to have a lamination of release films on both sides, it is preferable that release films having difference release forces are attached on the both sides so as to be easily peeled off. Particularly, in consideration of a balance of the release forces of the release films on the both sides, when the release force of one release film is assumed as 1.0, the release force of the other release film is preferably 1.2 folds or more thereof.

Figure 2:
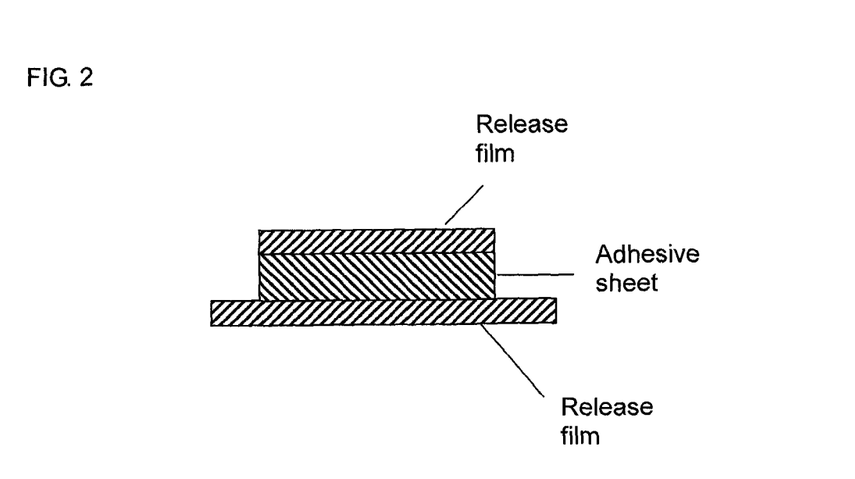
FIG. 2 is a sectional view that shows one exemplary constitution in which one release film is projected from the margins of a transparent adhesive sheet when release films are laminated on both sides of the transparent adhesive sheet.

Furthermore, when the piece of the present adhesive sheet is constituted to have a lamination of release films on both sides, any one of the release films on the both sides may be formed so as to be projected from the margins of the piece of the present adhesive sheet. For example, as shown in FIG. 2, one release film may be formed such that the margins thereof fit to the margins of the piece of the present adhesive sheet, and the other release film may be formed such that the margins thereof are projected from the margins of the piece of the present adhesive sheet, for example, projected over the whole circumference and thus look like a frame from top view.

As described above, by the release film being formed to be projected from the margins of the piece of the present adhesive sheet, the release film can be easily peeled off by gripping this projected portion. Furthermore, the release film being formed to be projected from the margins of the piece of the present adhesive sheet allows prevention of the adhesive agent from being protruded and soiled.

A method of forming one of the release films on the both sides to be projected from the margins of the piece of the present adhesive sheet as described above, is performed by, for example, forming a laminated sheet of the two release films and the piece of the present adhesive sheet with the margins of them fitting to each other, slitting up the laminated sheet along the margins to the depth of one release film and the piece of the present adhesive sheet not so as to cut the laminated sheet from the side of one release film to the side of the other release film, and releasing the outside portion of the slit up. However, the forming method is not limited to such method.

The present adhesive sheet and a piece thereof may be laminated, for example, on the back side of a protective panel, to form an adhesive material-attached protective panel body (referred to as "the present adhesive material-attached protective panel body").

As described above, the present adhesive sheet or a piece thereof may be directly laminated to a protective panel simultaneously at the time of manufacturing the present adhesive sheet or a piece thereof, whereby to strongly bring the interfaces of the protective panel and the adhesive sheet into intimate contact with each other, and further improve durability. At this time, it is preferable that the present adhesive sheet or a piece thereof is first laminated to the release film side, and then immediately brought into intimate contact with the back side of the protective panel, and cured.

At this time, the condition for curing is not particularly limited, but for example, standing at room temperature for 7 days, or standing at 40° C. for 3 days may be performed.

The protective panel, which is the adherend, may be selected, for example, from a glass, an acrylic resin, a polycarbonate resin, an alicyclic polyolefin resin, a vinyl chloride resin, a nylon resin, an epoxy resin and a styrene resin.

On both sides of the protective panel, anti-reflection treatment, anti-scattering treatment, hard coating treatment, design (cutting, printing) process or touch panel function may be previously applied.

The present adhesive sheet and a piece thereof can be adhered without foaming at high temperature even when the adherend is composed of a material generating outgas. Therefore, effects of the present invention can be further exerted when a protective panel, which is the adherend, is plastic that can generate outgas, i.e., an acrylic resin, a polycarbonate resin, an alicyclic polyolefin resin, a vinyl chloride resin, a nylon resin, an epoxy resin, a styrene resin and the like.

Furthermore, the present adhesive sheet and a piece thereof may be laminated, for example, to a touch panel body to form an adhesive material-attached touch panel body (referred to as the "present adhesive material-attached touch panel body").

As described above, the present adhesive sheet or a piece thereof may be directly laminated to a touch panel body simultaneously at the time of manufacturing the present adhesive sheet or a piece thereof, whereby to strongly bring the interfaces of the touch panel body and the adhesive sheet into intimate contact with each other, and further improve durability. At this time, it is preferable that the present adhesive sheet or a piece thereof is first laminated to the release film side, and then immediately brought into intimate contact with the touch panel body, and cured.

At this time, the condition for curing is not particularly limited, but for example, standing at room temperature for 7 days, or standing at 40° C. for 3 days may be performed.

An image display device can be prepared with use of the piece of the present adhesive sheet or the present adhesive material-attached protective panel body.

For example, with use of the piece of the present adhesive sheet, a protective panel and an image display panel, or a touch panel body and an image display panel, or a touch panel body and a protective panel may be directly bonded. When the present adhesive material-attached protective panel body is used, it is possible to cut down preliminary adhesion process at a manufacturing process of an image display device, and further improve productivity.

For example, it is possible to constitute image display devices such as a mobile phone, a portable game machine, a mobile terminal and a fish finder.

Herein, an image display device with touch panel function that is currently most general, i.e., a resistive touch panel display device is constituted by disposing "a touch panel body" on an "image display panel" such as LCD, and disposing a protective panel on the touch panel body if necessary, wherein the "touch panel body" is constituted by disposing a tiny spacer (dot spacer) on a glass substrate, on which a transparent conductive film (for example, ITO film) is formed, and on top of that, laminating a film, on which a transparent conductive film (for example, ITO film) is formed (for example, PET).

When such image display device with touch panel function is constituted with use of the piece of the present adhesive sheet, it may be constituted by direct bonding of a touch panel body and an image display panel, or a touch panel body and a protective panel as described above.

At this time, when the present adhesive material-attached protective panel body is used, it is possible to cut down preliminary adhesion process at a manufacturing process of an image display device, and further improve productivity.

A surface of a touch panel body attached with the piece of the present adhesive sheet may be suitably selected from, for example, a glass, a polyester resin, a TAC resin and the like.

(Explanation for Expressions and the Like)

According to JIS, generally, the term "sheet" refers to a thin, small and flat product for its length and width thereof, and the term "film" refers to a thin flat product that has an extremely small thickness for its length and width thereof, the maximum thickness thereof being limited arbitrarily, and is normally supplied in the form of a roll (JIS K 6900). However, as the boundary between a sheet and a film is not determined and there is no need in the present invention to distinguish the two by words, in the present invention, "sheet" is deemed included even when referring to "film", and "film" is deemed included even when referring to "sheet".

Furthermore, expressions of the "panel" or the "panel body" such as an image display panel and a protective panel, encompasses a plate body, a sheet and a film, or a laminated body thereof.

Furthermore, in the present invention, when the expression "major component" is used, unless expressly noted, it includes the meaning of allowing another component to be contained in a range that does not hinder the function of the major component.

Although not to specify the content ratio of the major component in particular, the content (when two or more components are the major component, the total content of them) is generally 50% or more by mass, particularly 70% or more by mass, and more particularly 90% or more by mass (including 100%) in a composition.

In addition, herein, when the notation "X to Y" (X and Y are arbitrary numbers) is used, unless expressly indicated, the meaning is "X or greater and Y or lower", and includes the meaning "preferably greater than X" or "preferably less than Y".

In addition, when the notation "X or greater" (X is an arbitrary number) or "Y or less" (Y is an arbitrary number) is used, this includes also the intent to the effect of "greater than X is desirable" or "less than Y is desirable".

EXAMPLES

Hereinafter, the present invention will be more specifically explained with Examples.

Hereinafter, "parts" means "weight parts".

<Measurement of G' and Tg>

The dynamic viscoelastic behavior was measured with use of "Dynamic Analyzer RDA II", which is a device for measuring viscoelasticity manufactured by Rheometrics Inc., in a shear method under the conditions described below.

Jig: φ25 mm parallel plate
Strain level: 0.5%
Frequency: 1 Hz
Temperature: −70 to 200° C. (measured at 3° C./min temperature elevation rate from −70° C.)
Sample thickness: 250 μm A sheet for formation of the first adhesive layer, a sheet for formation of the second adhesive layer and a laminated sheet by laminating and integration of the sheet for formation of the first adhesive layer and the sheet for formation of the second adhesive layer were taken as samples for measurement, respectively. The values of the storage modulus G' at 20° C. and 150° C. of these measurement samples (adhesive sheets) and the maximum values of Tan δ as Tg were read.

<Measurement of Accumulated Photo Amount>

The accumulated photo amount at 365 nm wavelength was measured with an ultraviolet accumulated photo amount meter "UIT-150" manufactured by USHIO INC mounted with an optical receiver "UVD-S365".

<Cutting Properties>

Adhesive sheets obtained in Examples and Comparative examples were cut with use of a Thomson's punching machine for 1 minute at 30 shot rate. At this time, it was observed whether or not punching was done without adhesion to the Thomson's knife.

○ (circle) means no adhesion to the Thomson's knife.

x (cross) means adhesion to the Thomson's knife.

<Thermal Durability>

In substitution for a protective panel, a PMMA plate (trademark: MR200, manufactured by Mitsubishi Rayon, Co. Ltd.) was used, which had 0.8 mm thickness, 50 mm width and 80 mm length, and of which the backside was printed only at the margins of the panel by 5 mm width and 10 μm thickness.

In substitution for a display panel, a soda-lime glass having 0.5 mm thickness, 50 mm width and 80 mm length was used.

Each of the adhesive sheets obtained in Examples and Comparative examples was punched by 45 mm width and 75 mm length with Thomson's press machine. Then, a release film on one surface side of the adhesive sheet was peeled off and the adhesive sheet was attached to the print margins of the backside-printed surface side of the PMMA plate so as to overlap in the four sides by 2.5 mm with a hand roll.

Then, a release film on the other remaining surface of the adhesive sheet was peeled off and the PMMA plate was attached to the glass plate via the adhesive sheet with a hand roll, and then the resulting lamination was finishing-adhered in an autoclave at 0.4 Mpa×30° C. for 15 minutes, to prepare a test sample.

The test sample prepared in a manner as described above was heated at 80° C. for three days, and observed for foaming, release and overflow of the adhesive material.

○ (circle) means that none of foaming, release and overflow was observed.

x (cross) means that any one of foaming, release and overflow was observed.

Example 1

(Preparation of First Adhesive Layer-Attached Sheet)

2.0 Weight parts of a photo initiator (trademark: Ezacure TZT, manufactured by Nihon SiberHegner) and 20 weight parts of a cross-linking agent (tetrafunctional acrylate (trademark: NK ester ATM-4PL, manufactured by Shin Nakamura Chemical, Co. Ltd.)) with respect to 100 weight parts of previously polymerized acrylic acid ester copolymer A were melt with stirring and uniformly mixed to prepare an adhesive agent composition.

This adhesive agent composition was applied to the release surface of a silicone-coated release PET film (trademark: MRF 50, manufactured by MITSUBISHI POLYESTER FILM CORPORATION) having a thickness of 50 μm with use of a hot-melt coater and then the silicone-coated release PET film was overlapped with another silicone-coated release PET film (trademark: MRF 50, manufactured by MITSUBISHI POLYESTER FILM CORPORATION) so that the adhesive agent composition was interposed between the two silicone-coated release PET films, and the lamination was molded to 200 μm of the adhesive layer thickness. Then, the lamination was irradiated onto the PET films from the both sides with 1000 mJ/cm$^2$, respectively (equivalent to a wavelength of 365 mm) using a high-pressure mercury lamp, thereby causing cross-link to prepare the first adhesive layer-attached sheet.

The acrylic acid ester copolymer A was obtained by solution polymerization in a composition ratio of 85% by weight of 2-ethylhexyl acrylate and 15% by weight of methyl methacrylate, and then removal of the solvent.

The molecular weight and the molecular weight distribution of the acrylic acid ester copolymer A measured with GPC were $2.7 \times 10^5$ of the weight average molecular weight (MW), and 6.3 of the weight average molecular weight (MW)/number average molecular weight (MN).

(Preparation of Second Adhesive Layer-Attached Sheet)

1.85 Weight parts of an isocyanate curing agent (trademark: L-45, manufactured by Soken Chemical & Engineering Co., Ltd.) and 0.5 weight part of an epoxy curing agent (trademark: E-5XM, manufactured by Soken Chemical & Engineering Co., Ltd.) with respect to 1000 weight parts of commercially available solvent-type acrylic adhesive agent (trademark: SK-DYNE 1882, manufactured by Soken Chemical & Engineering Co., Ltd.) were uniformly mixed to prepare an adhesive agent solution.

This adhesive agent solution was applied to the release surface of a silicone-coated release PET film (trademark: MRF 50, manufactured by MITSUBISHI POLYESTER FILM CORPORATION) having a thickness of 50 μm with use of a hot-melt coater to 25 μm thickness, and the solvent was dried to prepare two pieces of the second adhesive layer-attached sheets having an adhesive layer of 25 μm thickness.

(Integration of First Adhesive Layer and Second Adhesive Layer)

The release PET films on both sides of the first adhesive layer-attached sheet were peeled off, and the both surfaces of the first adhesive layer were brought into intimate contact and integrated with the adhesive layers of the second adhesive layer-attached sheet, respectively, which were immediately after drying the solvent, and the lamination was left to stand for maturation at room temperature (23° C.) for 7 days, to achieve an adhesive sheet having adhesive layers of two kind, three layers (the second/the first/the second) having 250 μm thickness.

Example 2

(Preparation of First Adhesive Layer-Attached Sheet)

The first adhesive layer-attached sheet used in Example 1 was used as the first adhesive layer-attached sheet in Example 2.

(Preparation of second adhesive layer-attached sheet)

2.0 weight parts of a photo initiator (trademark: Ezacure TZT, manufactured by Nihon SiberHegner) and 5 weight parts of a cross-linking agent (trifunctional acrylate (trademark: Viscoat V295, manufactured by OSAKA ORGANIC CHEMICAL INDUSTRY LTD.)) with respect to 100 weight parts of previously polymerized acrylic acid ester copolymer B were melt with stirring and uniformly mixed to prepare an adhesive agent composition.

This adhesive agent composition was applied to the release surface of a silicone-coated release PET film (trademark: MRF 50, manufactured by MITSUBISHI POLYESTER FILM CORPORATION) having a thickness of 50 μm with use of a hot-melt coater and then the silicone-coated release PET film was overlapped with another silicone-coated release PET film (trademark: MRF 50, manufactured by MITSUBISHI POLYESTER FILM CORPORATION) so that the adhesive agent composition was interposed between the two silicone-coated release PET films, and the lamination was molded to 25 μm of the adhesive layer thickness. Then, the lamination was irradiated onto the PET films from the both sides with 500 mJ/cm², respectively (equivalent to a wavelength of 365 mm) using a high-pressure mercury lamp, thereby causing cross-link to prepare the second adhesive layer-attached sheet.

The acrylic acid ester copolymer B was obtained by solution polymerization in a composition ratio of 70% by weight of 2-ethylhexyl acrylate, 25% by weight of vinyl acetate and 5.0% by weight of acrylic acid, and then removal of the solvent.

The molecular weight and the molecular weight distribution of the acrylic acid ester copolymer B measured with GPC were $5 \times 10^5$ of the weight average molecular weight (MW), and 9.0 of the weight average molecular weight (MW)/number average molecular weight (MN).

(Integration of First Adhesive Layer and Second Adhesive Layer)

In the same manner as in Example 1, an adhesive sheet having adhesive layers of two kind, three layers (the second/the first/the second) of 250 μm thickness was obtained.

Example 3

(Preparation of First Adhesive Layer-Attached Sheet)

0.5 Weight part of a photo initiator (trademark: Ezacure TZT, manufactured by Nihon SiberHegner) and 20 weight parts of a cross-linking agent (tetrafunctional acrylate (trademark: NK ester ATM-4PL, manufactured by Shin Nakamura Chemical, Co. Ltd.)) with respect to 100 weight parts of previously polymerized acrylic acid ester copolymer C were melt with stirring and uniformly mixed to prepare an adhesive agent composition.

This adhesive agent composition was applied to the release surface of a silicone-coated release PET film (trademark: MRF 50, manufactured by MITSUBISHI POLYESTER FILM CORPORATION) having a thickness of 50 μm with use of a hot-melt coater and then the silicone-coated release PET film was overlapped with another silicone-coated release PET film (trademark: MRF 50, manufactured by MITSUBISHI POLYESTER FILM CORPORATION) so that the adhesive agent composition was interposed between the two silicone-coated release PET films, and the lamination was molded to 200 μm of the adhesive layer thickness. Then, the lamination was irradiated onto the PET films from the both sides with 1000 mJ/cm², respectively (equivalent to a wavelength of 365 mm) using a high-pressure mercury lamp, thereby causing cross-link to prepare the first adhesive layer-attached sheet.

The acrylic acid ester copolymer C was obtained by solution polymerization in a composition ratio of 77% by weight of 2-ethylhexyl acrylate, 19% by weight of vinyl acetate and 4.0% by weight of acrylic acid, and then removal of the solvent.

The molecular weight and the molecular weight distribution of the acrylic acid ester copolymer C measured with GPC were $4 \times 10^5$ of the weight average molecular weight (MW), and 8.0 of the weight average molecular weight (MW)/number average molecular weight (MN).

(Preparation of Second Adhesive Layer-Attached Sheet)

The second adhesive layer-attached sheet used in Example 1 was used as the second adhesive layer-attached sheet in Example 3.

(Integration of First Adhesive Layer and Second Adhesive Layer)

In the same manner as in Example 1, an adhesive sheet having adhesive layers of two kind, three layers (the second/the first/the second) of 250 μm thickness was obtained.

Comparative Example 1

According to Example 1 of JP-A No. 2002-348150, an adhesive sheet was prepared by a method described below.

2.0 Weight parts of 2-isocyanate ethyl methacrylate as an organic functional group-containing (meth)acrylate monomer, 2.0 weight parts of 1-hydroxy-cyclohexyl-phenyl ketone as a photo polymerization initiator and 2.0 weight parts of acetyl acetone zinc salt as a metal compound with respect to 100 weight parts of an acrylic acid ester copolymer were melt with stirring, and then molded to a sheet shape of 250 μm thickness between the release films to achieve a monolayer adhesive sheet that was not irradiated by ultraviolet.

The composition of the acrylic acid ester copolymer used was by copolymerization of 78.4% by weight of n-butyl acrylate, 19.6% by weight of 2-ethylhexyl acrylate: and 2.0% by weight of acrylic acid.

The molecular weight and the molecular weight distribution of the acrylic acid ester copolymer measured with GPC were $2.27 \times 10^6$ of the weight average molecular weight (MW), and 3.6 of the weight average molecular weight (MW)/number average molecular weight (MN).

Comparative Example 2

According to Example 1 of WO2006/112311, an adhesive sheet was prepared by the method described below.

As a sheet having an inorganic oxide layer, a sheet with alumina vapor-deposited on one side of a biaxially oriented polyester sheet having a thickness of 25 μm (trademark: FINE BARRIER AT, manufactured by REIKO Co., Ltd.) was used. As an adhesive agent of the layer formed on one side of the sheet, the adhesive agent cross-linked with ultraviolet light described below was used.

Acrylic monomers containing 78.4 weight parts of n-butyl acrylate, 19.6 weight parts of 2-ethylhexyl acrylate and 2.0 weight parts of acrylic acid were random-copolymerized in ethyl acetate solvent using a polymerization initiator (extra pure reagent manufactured by Nacalai Tesque, Inc.), thereby to prepare a polymer solution. Then, ethyl acetate was desolvated from the solution, to achieve an acrylic acid ester polymer in a solid state.

The molecular weight and the molecular weight distribution of this polymer measured with GPC were $2.27 \times 10^5$ of the weight average molecular weight (MW), and 3.6 of the weight average molecular weight (MW)/number average molecular weight (MN).

0.3 Weight part of a hydrogen-abstracting photoinitiator and 0.1 weight part of a difunctional monomer (Viscoat 260, manufactured by Osaka Organic Chemical Industry, Ltd.) were added to 100 weight parts of the polymer in the solid state, and the resulting mixture was melted with stirring. The resulting mixture was applied to the release surface of a silicone-coated release PET film (MRF 50, manufactured by MITSUBISHI POLYESTER FILM CORPORATION) having a thickness of 50 μm with a hot-melt coater to a thickness of 200 μm. Then, the silicone-coated release PET film with the mixture applied thereto was laminated on the surface that was not vapor-deposited with alumina of the sheet having the inorganic oxide layer to be in intimate contact with the sheet, and then, the lamination was irradiated from the both sides with a total energy of 2000 mJ/cm² of ultraviolet light (equivalent to a wavelength of 365 mm) using a high-pressure mercury lamp, thereby causing cross-link.

As the adhesive agent of the layer formed on the other side of the sheet, the adhesive agent cross-linked by moisture described below was used.

1.85 weight parts of an isocyanate curing agent (trademark: L-45, manufactured by Soken Chemical and Engineering, Co., Ltd.) and 0.5 weight part of an epoxy curing agent (trademark: E-5XM, manufactured by Soken Chemical and Engineering, Co., Ltd.) were uniformly mixed with respect to 1000 weight parts of an acrylic adhesive (trademark: SK-DYNE 1882, manufactured by Soken Chemical and Engineering, Co., Ltd.), thereby to prepare an adhesive agent solution. This solution was applied to the release surface of a silicone-coated release PET film (MRF 50, manufactured by MITSUBISHI POLYESTER FILM CORPORATION) having a thickness of 38 μm with a hot-melt coater to a thickness of 25 μm. Then, the silicone-coated release PET film with the solution applied thereto was laminated on the surface vapor-deposited with alumina of the sheet having the inorganic oxide layer to be in intimate contact with the sheet, and then, the lamination was left to stand at room temperature (23° C.) for seven days, thereby causing sufficient cross-link.

Comparative Example 3

According to Example 1 of JP-A No. 2001-234129, an adhesive sheet was prepared by a method described below.

(Preparation of First Adhesive Layer-Attached Sheet)

An acrylic acid ester copolymer was cross-linked with a metal compound, whereby to form a pressure-sensitive adhesive sheet having a thickness of 200 μm as the first pressure-sensitive adhesive layer.

More specifically, 0.5 weight part of acetyl acetone zinc salt as the metal compound and 0.7 weight part of acetyl acetone aluminum salt with respect to 100 weight parts of the acrylic acid ester copolymer were melt with stirring, and then molded into a sheet shape between release films to a desired thickness, whereby to achieve the first pressure-sensitive adhesive layer.

(Preparation of Second Adhesive Layer-Attached Sheet)

Furthermore, 9.0 weight parts of a solution of tolylene diisocyanate (TDI) adjusted to 25% by weight with ethyl acetate as a cross-linking agent, with respect to 100 weight parts of a solution of the uncross-linked acrylic acid ester copolymer, which was adjusted to 40% by weight of the solid content with ethyl acetate, was mixed with stirring, and the resulting mixture was applied on a release film, and the solvent was dried, to achieve the second pressure-sensitive adhesive layer having a thickness of 25 μm.

The first pressure-sensitive adhesive sheet was overlapped with the second pressure-sensitive adhesive layer to be interposed, to achieve an adhesive sheet having release films on both sides of the adhesive sheet and having an thickness of 250 μm.

The acrylic acid ester copolymer was obtained by copolymerization of 78.4% by weight of n-butyl acrylate, 19.6% by weight of 2-ethylhexyl acrylate and 2.0% by weight of acrylic acid. The molecular weight and the molecular weight distribution of the acrylic acid ester copolymer measured with GPC were $2.27 \times 10^6$ of the weight average molecular weight (MW), and 3.6 of the weight average molecular weight (MW)/number average molecular weight (MN).

TABLE 1

| | G' of transparent adhesive sheet (Pa) | | G' of sheet for formation of first adhesive layer (Pa) | | G' of sheet for formation of second adhesive layer (Pa) | | Transparent adhesive sheet | Sheet for formation of first adhesive layer | Sheet for formation of second adhesive layer | Cutting property of adhesive | Thermal |
|---|---|---|---|---|---|---|---|---|---|---|---|
| | 20° C. | 150° C. | 20° C. | 150° C. | 20° C. | 150° C. | Tg(° C.) | Tg(° C.) | Tg(° C.) | sheet | durability |
| Example 1 | $1 \times 10^5$ | $3 \times 10^4$ | $1 \times 10^5$ | $2 \times 10^4$ | $1 \times 10^6$ | $4 \times 10^5$ | −20 | −20 | −5 | ○ | ○ |
| Example 2 | $1 \times 10^5$ | $1 \times 10^4$ | $1 \times 10^5$ | $2 \times 10^4$ | $5 \times 10^5$ | $1 \times 10^5$ | −20 | −20 | −7 | ○ | ○ |
| Example 3 | $3 \times 10^5$ | $8 \times 10^4$ | $3 \times 10^5$ | $3 \times 10^4$ | $1 \times 10^6$ | $4 \times 10^5$ | −10 | −15 | −5 | ○ | ○ |
| Comparative example 1 | $4 \times 10^4$ | $2 \times 10^2$ | $4 \times 10^4$ | $2 \times 10^2$ | | | −30 | −30 | | ○ | x |
| Comparative example 2 | $1 \times 10^4$ | $1 \times 10^3$ | $1 \times 10^4$ | $1 \times 10^3$ | $1 \times 10^6$ | $4 \times 10^5$ | −30 | −30 | −5 | x | ○ |
| Comparative example 3 | $4 \times 10^4$ | $2 \times 10^3$ | $3 \times 10^4$ | $2 \times 10^3$ | $2 \times 10^5$ | $1 \times 10^4$ | −30 | −30 | −25 | ○ | x |

(Discussion)

As known from Table 1, it was found that when the adhesive sheet of Examples 1 to 3 was used, the adhesive sheet was good in the cutting property, and excellent in workability at the punching machine. Furthermore, it was found that from the heating test for the samples to which the processed adhesive sheet were adhered, the adhesive sheet had no foaming, release, overflow and the like, and was excellent in actual use. In comparison with this, it was found that the adhesive sheet of Comparative examples 1 to 3 was sticky and did not meet punching workability, or did not meet thermal durability, or deteriorated in any of them.

Since an acrylic resin has a degradation temperature around 200° C., it was normally not considered to prescribe viscoelastic characteristics at 150° C. of an adhesive agent having the acrylic resin as a base compound.

The invention claimed is:

1. A laminate, comprising:
a protective panel body;
a transparent adhesive sheet laminated on to a back surface of the protective panel body; and
a touch panel laminated on to a back surface of the transparent adhesive sheet;
wherein:
the protective panel body has a thickness of greater than 0.8 mm;
the protective panel body comprises glass;
the transparent adhesive sheet comprises:
  one or more layers of a first adhesive layer; and
  one or more layers of a second adhesive layer;
the first adhesive layer and the second adhesive layer are arranged so that no outgas barrier layer is provided between the first adhesive layer and the second adhesive layer;
the first and second adhesive layers exhibit different viscoelastic behaviors;
the first and second adhesive layers are integrally laminated;
either the first adhesive layer or the second adhesive layer comprises a composition comprising an acrylic acid ester polymer, a multifunctional (meth)acrylate cross-linking agent having more than two(meth) acryloyl groups and a reaction initiator; and
a dynamic shear storage modulus G' of the transparent adhesive sheet is within the ranges below when measured with a 1 Hz frequency temperature dispersion:
G'(20° C.) is $2 \times 10^4$ to $5 \times 10^5$ Pa; and
G'(150° C.) is $1 \times 10^4$ to $1 \times 10^5$ Pa.

2. The laminate according to claim 1, wherein:
the second adhesive layer is laminated on to the back surface of the protective panel body; and
a dynamic shear storage modulus G' of the first adhesive layer is within the ranges below when measured with a 1 Hz frequency temperature dispersion:
G'(20° C.) is $2 \times 10^4$ to $5 \times 10^5$ Pa; and
G'(150° C.) is $1 \times 10^4$ to $1 \times 10^5$ Pa.

3. The laminate according to claim 1, wherein:
dynamic shear storage moduli G' of the first adhesive layer and the second adhesive layer are within the ranges below when measured with a 1 Hz frequency temperature dispersion:
G'(20° C.) of the first adhesive layer is $2 \times 10^4$ to $5 \times 10^5$ Pa;
G'(150° C.) of the first adhesive layer is $1 \times 10^4$ to $1 \times 10^5$ Pa;
G'(20° C.) of the second adhesive layer is $2 \times 10^5$ to $5 \times 10^6$ Pa; and
G'(150° C.) of the second adhesive layer is $5 \times 10^4$ to $5 \times 10^5$ Pa.

4. The laminate according to claim 2, wherein:
dynamic shear storage moduli G' of the first adhesive layer and the second adhesive layer are within the ranges below when measured with a 1 Hz frequency temperature dispersion:
G'(20° C.) of the first adhesive layer is $2 \times 10^4$ to $5 \times 10^5$ Pa;
G'(150° C.) of the first adhesive layer is $1 \times 10^4$ to $1 \times 10^5$ Pa;
G'(20° C.) of the second adhesive layer is $2 \times 10^5$ to $5 \times 10^6$ Pa; and
G'(150° C.) of the second adhesive layer is $5 \times 10^4$ to $5 \times 10^5$ Pa.

5. The laminate according to claim 1, wherein the protective panel body has a print unevenness on the back surface.

6. The laminate according to claim 1, wherein at least one of the one or more layers of the first adhesive layer is in contact with at least one of the one or more layers of the second adhesive layer.

7. The laminate according to claim 1, wherein:
the first adhesive layer comprises a composition comprising an acrylic acid ester polymer having a glass transition temperature of less than −10° C., a multifunctional (meth)acrylate cross-linking agent having more than two(meth) acryloyl groups, and a cross-linking initiator; and
the second adhesive layer comprises a composition comprising an acrylic acid ester polymer having a glass transition temperature of at least −10° C., a multifunctional (meth)acrylate cross-linking agent having more than two(meth) acryloyl groups, and a cross-linking initiator.

* * * * *